United States Patent [19]
Toy

[11] 3,768,975
[45] Oct. 30, 1973

[54] HYDROGEN DETECTION MEANS

[75] Inventor: Stephen M. Toy, Orange, Calif.

[73] Assignee: McDonnell Douglas Corporation, Santa Monica, Calif.

[22] Filed: July 9, 1971

[21] Appl. No.: 161,133

[52] U.S. Cl. .......................... 23/253 TP, 117/169 R
[51] Int. Cl. .............................................. G01n 31/22
[58] Field of Search .................... 23/253 TP, 232 R, 23/254 R, 254 E; 117/169 R

[56] References Cited
UNITED STATES PATENTS
2,918,033  12/1959  Snyder .......................... 23/253 TP
3,379,558  4/1968   Upton .......................... 117/169 R X OTHER PUBLICATIONS
D. K. Wilburn, Chem. Abstr. 58, 8526h (1963).

Primary Examiner—Robert M. Reese
Attorney—Walter J. Jason et al.

[57] ABSTRACT

A substrate having a thin layer of rare earth metal applied thereon. The substrate can be applied to a specimen with the rare earth layer held in contact thereagainst so that hydrogen in the specimen can react with the rare earth metal to form a rare earth hydride. Examination of the reacted tape enables calculation of the amount of hydrogen in the specimen and the locating of hydrogen concentrations that may exist therein.

11 Claims, 6 Drawing Figures

HYDROGEN DETECTION MEANS

CROSS-REFERENCE TO A RELATED APPLICATION

This application relates to the subject matter of U.S. Patent application entitled RARE EARTH HYDROGEN DETECTOR by Stephen M. Toy and Austin Phillips, Ser. No. 155,019 filed June 21, 1971 and assigned to Applicant's assignee and reference is made to the information therein as though fully set forth hereinbelow.

BACKGROUND OF THE INVENTION

It has been well recognized and confirmed by many investigators that the most insidious element that effects the properties of metal alloys is hydrogen since hydrogen absorbed in metals can result in lowered tensile, ductility and impact strength. Hydrogen has proved to be the most difficult element to detect and quantitatively analyze because of its very small atomic weight and the fact that it requires only an infinitesimal amount of hydrogen to grossly effect the properties of hydrogen sensitive metals. Unfortunately hydrogen can enter metals by the usual processing procedures performed on fabricated parts such as welding, plating, cleaning and heat treating or it may be picked up from the service environment as the result of cathodic protection reactions or corrosion reactions. Heretofore there has been no satisfactory means by which to nondestructively measure the amount of hydrogen absorbed in a specimen known to be sensitive to hydrogen embrittlement or prevent such absorbtion. There has also been no method by which to judge whether plating, potting and other similar materials commonly used in conjunction with hydrogen sensitive metals have small quantities of free hydrogen therein which hydrogen, of course, can transfer to the metal to embrittle it.

BRIEF DESCRIPTION OF THE INVENTION

The present invention detection tape can be used to study the position and amount of hydrogen present in materials and is not only nondestructive in nature but is also curative in certain circumstances. The invention comprises a flexible substrate such as metal or nonmetal tapes onto which a thin film of a rare earth metal such as neodymium is deposited. The film is then pressed tightly against the surface of the material suspected to have hyodrgen therein. The tape is held in place on the specimen and in some circumstances the specimen and the tape are heated to increase the hydrogen emitting from the speciment annd assure the reaction of the rare earth metal and the hydrogen. The hydrogen emitting from the specimen reacts with the rare earth metal film to form hydride reaction sites therein. If a transparent substrate, such as one that is optically transparent is used, it is possible to detect concentrations of hydrogen in the specimen by observing the hydride sites which occur in juxtaposition to the hydrogen concentrations in the specimen. If an opaque substrate is used, the tape is stripped from the specimen's surface and observed from the film side. The hydride sites in the rare earth metal film can in most instances, be observed visually or under an optical microscope and in all instances, by means of a scanning electron microscope. By calculating the amount of hydrogen in the observed hydride sites it is possible to calculate the hydrogen concentration of the specimen directly. Hydrogen concentrations sufficient to cause embrittlement, which have been found to be as low as 0.73 ppm hydrogen, can be readily detected. In fact, when a scanning electron microscope is used to read the tape, hydrogen concentrations as low as 0.001 ppm can be detected.

The tape is also useful to measure hydrogen accumulation rate for metals exposed to actual environments, measure hydrogen permeation rate through metals and seals, and in the test and certification of nonhydrogen embrittling chemical solutions, such as plating solutions, solvents and pickling solutions normally applied to hydrogen sensitive metals. In addition, the tape can be used to test for hydrogen contaminate sources on metals such as oils, adhesives and sealants. The tape has specific applications in many diverse industries and even can be used to measure stress induced hydrogen segregation metals, to measure the corrosion rate where the corrosion redox cell is identifiable with a hydrogen reduction reaction and perform a hydrogen analysis to predict part life at specific stress levels and in specific corrosive media.

The tape is as simple to use as a Bandaid and may cost below $2.00 per test. In some applications, such as a Go-No Go test for Martensitic type steels, the tape not only can be used in the field but can be read in the field with no special reading equipment required.

It is therefore an object of the present invention to provide means for conveniently and economically determining the hydrogen concentration of a specimen.

Another object is to provide means which can be used as a hydrogen barrier so that hydrogen sensitive specimens may be protected from hydrogen.

Another object is to provide a hydrogen detection tape by which it is possible to nondestructively test specimens for hydrogen down to levels lower than those levels causing hydrogen embrittlement of the specimen.

Another object is to provide means by which it is possible to measure the hydrogen concentration in speciments which are remote from any laboratory facility.

Another object is to provide a hydrogen detection device which can be used to detect free hydrogen in any sort of material of any shape.

Another object is to provide hydrogen detection means which can be used at ambient or higher temperatures so that the specimen under test need not be removed from its normal enviroment.

These and other objects and advantages of the present invention will become apparent after considering the following detailed specification which covers preferred embodiments thereof in conjunction with the accompanying drawings wherein:

DETAILED DESCRIPTION OF THE PRESENT EMBODIMENTS

The hydrogen detection tape is produced by applying a thin film of rare earth metal such as neodymium on a substrate which is usually flexible and chosen to have a thermal expansion and contraction coefficient similar to the rare earth metal applied thereon so the tape can be subjected to temperature changes without damage or distortion; and any of the rare earths which form hydrides such as cerium, neodymium, praseodymium and yttrium, are suitable in the present invention. In the following example, neodymium is used as the rare earth since its hydriding characteristics seem to be the most consistent at temperatures as low as room temperature.

EXAMPLE 1

Figure 1:
FIG. 1 is a photomicrograph of a Nd tape after exposure to $H_2$ with arrows indicating $NdH_2$ reaction sites.

A neodymium layer 1,900A thick was deposited on ½ inch by ½ inch squares of previously degreased ½ mil thick aluminum foil by evaporating a small quantity of neodymium adjacent the foil in a chamber in which the pressure had been reduced to $10^{-5} - 10^{-6}$ mm Hg. The foil faces containing the neodymium film were then pressed against AISI 4340 steel specimen faces charged with hydrogen. Pressure sensitive tapes having an aluminum backing and a non-acid type silicone adhesive were placed over the aluminum foils to hold them in place. One sample was heated to 395°F for 1 hour in a vacuum reactor tube while a second sample was kept at room temperature. The neodymium hydrogen detector tapes were then removed and examined for neodymium dihydride reaction sites. Both the room temperature and the 395°F exposure specimens revealed neodymium dihydride reaction sites at magnifications of 10 times. Some hydrogen reaction sites were visible to the naked eye which indicated the presence of high local concentrations of hydrogen in the AISI 4340 steel in the range of 150 to 500 ppm. A photograph of the reacted detection tape exposed at 395°F for one hour is shown magnified 20 times in FIG. 1 with two of the many black neodymium dihydride reaction sites indicated by arrows.

EXAMPLE 2

Figure 2:
FIG. 2 is a phtotgraph of Nd tape after use testing for $H_2$ in an aircraft part.

Flexible hydrogen detection tapes constructed similarly to those of Example 1, 2 inches wide by 12 inches long by ½ mil thick (which provides maximum flexibility without loss in an aluminum foil strength) were applied to previously degreased and cleaned outside and inside surfaces of a landing gear of a DC-8 where cracks were located. Two hot air guns were used to heat the AISI 4340 steel surface locally to 250°F. The temperature was recorded by Tempstik measurements. The part was maintained at 250°F for 30 minutes. The tape was stripped from the landing gear after it cooled and the reaction neodymium films were examined by eye. As shown in FIG. 2, no reaction sites were visible. Optical microscopic examination of the films revealed only a few tiny hydrogen reaction sites when a magnification of 175 times was used. Calculations were made to determine that the overall hydrogen content ofthe landing gear was less than 2 ppm hydrogen.

Figure 3:
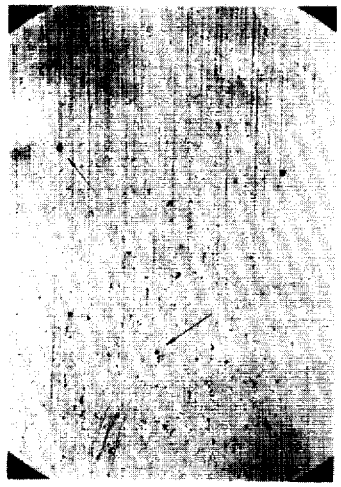
FIG. 3 is a photomicrograph of an exposed Nd tape magnified about 50X with the arrows indicating typical $NdH_2$ reaction sites.
Figure 4:
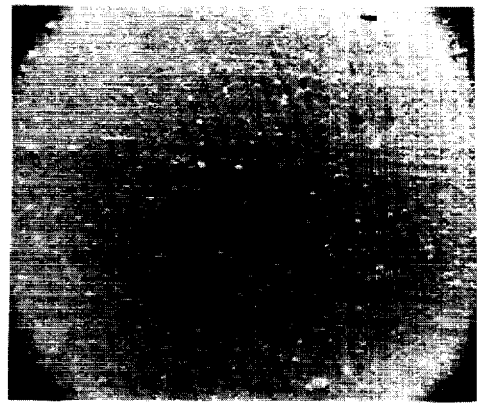
FIGS. 4 and 5 are scanning electron micrographs of Nd tapes magnified about 2,400X and 10,250X respectively with local $NdH_2$ reaction sites indicated by arrows.
Figure 5:
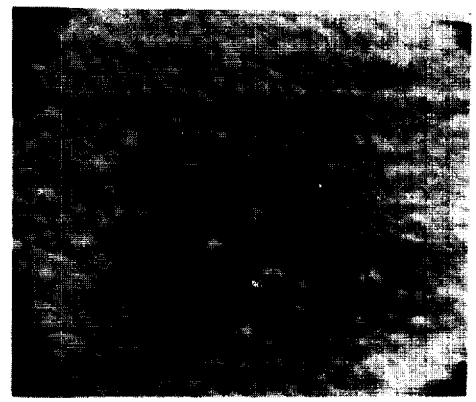

Roughly, with the present tapes, if reaction sites can be seen by the unaided eye, local hydrogen content is greater than 150 ppm. Continuous determination of $H_2$ concentrations from 150 ppm to 0.01 ppm local $H_2$ can be made when an optical microscope is used to "read" the film and concentration to 0.001 ppm local $H_2$ can be detected when an electron microscope is employed. For example, FIG. 3 is a photomicrograph of a 1,400A Nd tape magnified 50X which indicates 1.33 ppm local $H_2$. FIGS. 4 and 5 are scanning electron micrographs of 1,400A Nd tapes magnified 2400X and 10,250X indicating 0.08 and 0.04 ppm local $H_2$ respectively. Higher sensitivity can be obtained by employing a thinner Nd film and through greater magnification. Experimental tapes with 700A thick Nd films have been constructed with no trouble. Thinner films have so far not been required as sufficient sensitivity for current areas of interest is present in the 1,400A thick films. The hydrogen content as determined by vacuum fusion analysis and by hydrogen detection tape in the laboratory have been within experimental error at less than 2 ppm levels.

The ability of the present invention to detect small concentrations of hydrogen can be utilized for purposes other than the bare detection of hydrogen. For example, tight defects in metals are often very difficult or impossible to detect by conventional nondestructive test methods such as ultrasonics, x-ray, magnaflux and the like. This is because the size of the defects are sometimes too small to cause sufficient interaction between the defect and the test method. However, hydrogen tends to enter a metal interstitially, is quite mobile at room temperatures in many metals, and its size is always small compared to the tight defect sizes. Therefore, it has been found that the amount of bulk hydrogen normally in a metal, which in the following example is 0.24 ppm, can be driven out of the metal into the defect which acts as a hydrogen channel to the metal surface. By applying the hydrogen detection tape of the present invention to the surface, an outline of the tight defect can be produced and therefore the lenght and location of the defect can be determined.

EXAMPLE 3

Figure 6:
FIG. 6 is a photograph of a Nd-Pr alloy tape after exposure to a welded aircraft part.

Hydrogen detection tape was used to detect tight defects in a DC-10 main landing gear side brace beam flash weld. A hydrogen detection tape, constructed by depositing a ¾ neodymium – ¼ praseodymium alloy on a one mil aluminum substrate, was positioned over the weld band on the beam. The beam with the tape held thereto was maintained at 395°F for 1 hour. Upon cooling, the tape was removed and visual observation of the tape revealed an intense hydrogen evolution on one side of the flash weld indicated by arrow 10 on FIG. 6. The potential hydrogen source was traced to an adhesive contaminant left by a masking tape along one side of the weld band. The high intensity of the hydrogen emissions obscured most of the tight defects in the weld band area of interest. It was still possible, however, to examine a few local weld sites in the area indicated by arrow 12 which, under an optical microscope showed that local emission had occurred along lines where defects were expected. Above the area of interest, the rare earth film as indicated by arrow 14 was unreacted and still transparent except for localized deterioration areas. Other tight defects that have been revealed by neodymium tapes are grain boundaries and segregation of hydrogen in local high tensile regions of a AISI 4340 hydrogen embrittlement stress ring.

The hydrogen detection tape must be protected from air and moisture to prevent deterioration during shipping and storage either before it has been used or afterward while it is awaiting the reading thereof. Present polymer packaging materials do not have sufficiently low gas transmission rates to effectively stop deterioration of the tape. Therefore, it has been found that an overlap wrapping of neodymium hydrogen detection tape over other pieces of detection tape can act as a barrier to protect the other tape by providing a protective covering. This results in a much better storage life for all types of the hydrogen detection tapes. For example, neodymium tape has been used to double the storage life of the detection tapes. The storate lives of neodymium and praseodymium-neodymium alloy tapes have exceeded 20 weeks with commercially available packaging alone.

Thus there has been shown and described hydrogen detection means by which it is possible to conveniently and economically detect local hydrogen concentrations in sample materials as low as 0.001 ppm hydrogen. Many changes, modifications, alterations, other uses and applications of the subject hydrogen detection means will become apparent to those skilled in the art after considering this specification and the accompaying drawings. All such changes, alterations, and modifications which do not depart from the spirit and scope of the invention are deemed to be covered by the invention which is limited only the the claims which follow.

I claim:

1. A hydrogen detection device comprised of:
   a flexible substrate; and
   a film of hydride forming rare earth metal deposited on the substrate, whereby said film can be held in close proximity to a specimen whose hydrogen content is to be detected and the hydrogen emitting from the sample will react with the film to form hydride sites which through observation, allow calculation of the hydrogen content of the specimen and the positions of local hydrogen concentrations therein.

2. The hydrogen detection device described in claim 1 wherein said rare earth film is chosen from a group consisting of cerium, neodymium, praseodymium and yttrium.

3. The hydrogen detection device described in claim 1 wherein said rare earth metal is neodymium.

4. The hydrogen detection device described in claim 1 wherein said substrate is optically transparent so hydride reaction sites can be observed without removing said device from the specimen and enabling convenient correlation of the reaction sites with the locations from which the hydrogen emanated.

5. The hydrogen detection device described in claim 1 wherein said film of rare earth metal is about 1,400A thick.

6. The hydrogen detection device described in claim 1 wherein the rare earth film is an alloy of neodymium and praseodymium.

7. The hydrogen detection device described in claim 1 wherein said flexible substrate is aluminum foil.

8. The hydrogen detection device described in claim 1 wherein said substrate is chosen so the thermal expansion coefficient thereof is similar to the thermal expansion coefficient of the rare earth film so said device can be subjected to temperature changes without damage.

9. The hydrogen detection device described in claim 1 wherein said rare earth film is between about 700A and 1,900A thick.

10. A method for providing protection to a specimen which is sensitive to hydrogen including the steps of:
    depositing a layer of hydride forming rare earth metal on at least one surface of a flexible substrate;
    wrapping said flexible substrate about the specimen to protect it.

11. The method of providing hydrogen protection described in claim 10 wherein said rare earth metal layer includes neodymium.

* * * * *

PO-1050
(5/69)

UNITED STATES PATENT OFFICE
CERTIFICATE OF CORRECTION

Patent No. 3,768,975          Dated 30 October 1973

Inventor(s) Stephen M. Toy

It is certified that error appears in the above-identified patent and that said Letters Patent are hereby corrected as shown below:

Col. 1, line 39, "invention" should be --hydrogen--;
        line 47, "hydorgen" should be --hydrogen--;
        line 50, "speciment annd" should be --specimen and--.
Col. 2, line 47, "enviroment" should be --environment--;
        line 57, "phtotgraph" should be --photograph--.
Col. 3, line 10, "; and" should not have been inserted;

line 61, "ofthe" should be --of the--.

Signed and sealed this 8th day of October 1974.

(SEAL)
Attest:

McCOY M. GIBSON JR.           C. MARSHALL DANN
Attesting Officer          Commissioner of Patents